INVENTOR.
ANTHONY B. CISTOLA
BY George J. Hetter
ATTORNEY

United States Patent Office 3,239,763

Patented Mar. 8, 1966

3,239,763
SIGNAL CONVERTER

Anthony B. Cistola, Vestal, N.Y., assignor to International Business Machines Corporation, New York, N.Y., a corporation of New York Filed June 5, 1963, Ser. No. 286,441
11 Claims. (Cl. 328—15)

Figure 1:
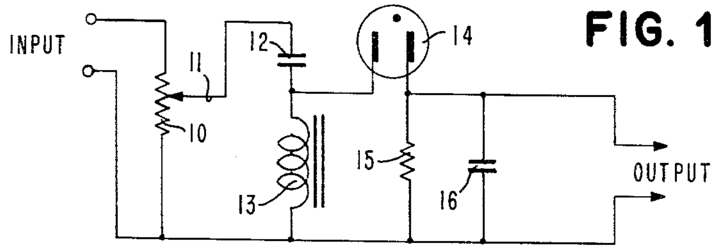

The present invention relates broadly to a signal converter, and more particularly to such a converter for selectively providing a pulse train having any one of a plurality of discrete frequencies and wave shapes.

In a variety of different electronic apparatus there is a frequent requirement for conversion of alternating voltages or pulse trains of a given frequency to some lower frequency which is a fixed sub-multiple of the given frequency. This type of conversion or transformation is conventionally referred to as frequency division, and a device for accomplishing this, a frequency divider. In other circumstances there is needed a special electric signal which is comprised of a number of contigous square wave pulses of increasing magnitude followed by a second similar set of contiguous pulses of decreasing magnitude, which pulses collectively provide what is termed a "staircase" voltage. Still a third type of device of the general character dealt with here is a frequency discriminator, which is apparatus for detecting and indicating the presence of electric signals of specified frequency values. A still further closely allied device is an asymmetric pulse generator, where the degree of asymmetricity is functionally related to a reference actuating pulse.

Illustrative of applications for devices of this general character, frequency division is commonly employed to provide clock generators in computers and is a basic operation in certain electrical musical instruments where a master oscillator generates a fundamental frequency and frequency division provides submultiples of this fundamental to obtain lower tones. Staircase voltages can be usefully employed in scanning circuits for television and radar. Also, asymmetrical pulse train apparatus are essential elements in pulse code modulation circuits in radio control telemetry.

It is therefore a primary object of the invention to provide circuit apparatus for transforming an electric signal of a specified frequency and character to a second signal of differing frequency and character.

A further object is the provision of such a circuit having controllability features permitting the selective generation of either symmetrical or asymmetrical sub-multiple frequency signals from a fundamental frequency electric signal.

Another object of the invention is the provision of circuit apparatus for transforming a pulse train into a staircase voltage.

Still another object is the provision of circuit apparatus as described in the above objects having the capability of detecting the presence of electric signals of selectively specified frequencies.

Another object is the provision of a frequency transforming apparatus of the above-described character which is of simple construction, easily fabricated, and highly reliable.

In brief, it is the contemplation here to provide a series resonant circuit input to a threshold voltage actuated current generating device for effecting selective frequency transformation.

The foregoing and other objects, features and advantages of the invention will be apparent from the following more particular description of preferred embodiments of the invention, as illustrated in the accompanying drawings.

In the drawings:

FIGURE 1 is one form of circuit schematic for practicing the invention.

FIGURES 2*a–e* are graphic representations of electric signal waveforms as measured at different points in the circuit of FIGURE 1.

FIGURES 3*a–d*, show comparative electric signal waveforms when the form of the invention of FIGURE 1 is operated as a staircase voltage generator.

FIGURES 4*a–d*, illustrate various electric signal forms with the above circuit operated to perform frequency division.

FIGURES 5*a–d*, show graphical comparison of various electrical signals as taken at different points of the above circuit during operation as an asymmetrical pulse generator.

Figure 6:
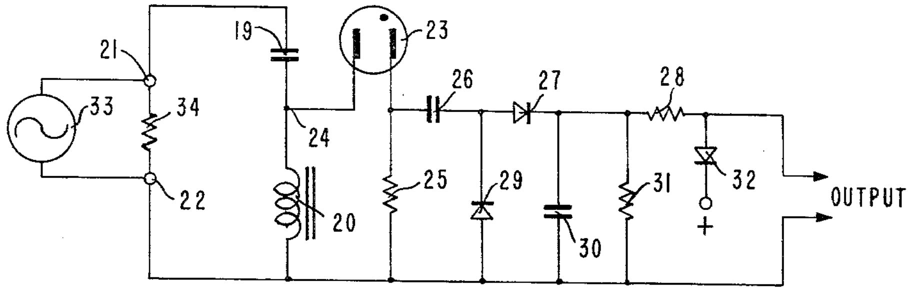

FIGURE 6 is a circuit schematic of a further form of the invention especially applicable for a frequency discrimination function.

Turning to FIGURE 1 and a first embodiment of the invention, input to the circuit is seen to be applied in shunt across the resistance of a potentiometer 10. The selectively variable contact point 11, or slidewire, of the potentiometer is connected to one side of a capacitance 12, the other side of which is connected to an inductance 13. The free end of the inductance is electrically related to one end of the resistance 10 such that the inductance and capacitance 12 collectively form a series resonant circuit arranged in parallel across a portion of the resistance, the electrical magnitude of this portion being determined and selectively settable by the slidewire 11.

The common point of the capacitance 12 and inductance 13 is interconnected with one electrode of a gas discharge device 14, such as a neon tube or lamp. The other terminal of the device is related via a load resistance 15 to the common point of the potentiometer resistance 10 and the inductance 13. A capacitance 16 is arranged in shunt to the load resistance 15 and it is across this capacitance that the output is taken.

Forcusing attention on the general principles of operation of the above described circuit without regard to accomplishing a particular function (i.e., frequency discrimination, or the like), output electric signals are provided at a rate dependent primarily on the rate, or frequency, at which the device 14 is conductive or "fires." In turn, the firing rate of the device 14 is a function of the time that it takes the inductance to develop a voltage equal to the ionization potential of the gas tube, which is dependent upon both the frequency and amplitude of the input voltage and particular setting of the potentiometer. Accordingly, with a known input electric signal, say square wave pulse train, and the circuit parameters other than the setting of the potentiometer being of a fixed character, the characteristics of the output signal are under the single control of the potentiometer setting.

Figure 2:
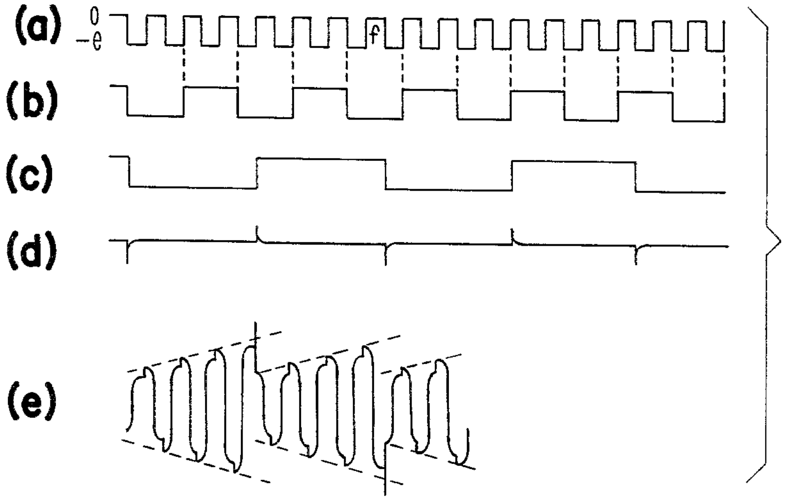

In the description of detailed circuit operation to follow reference should be made to FIGURE 2. Input or energizing voltage (FIGURE 2*a*) is assumed to be a square wave, symmetric pulse train of constant amplitude excursion. Specifically, the voltage excursion is illustrated as varying between a zero reference base and some fixed negative value, $-e$, and the frequency of this voltage is a constant value, $f$. As is well known, voltage will build up and decay across the inductance 13 at a rate directly dependent upon the frequency, $f$, of the input voltage, where the maximum magnitude developed across the inductance is adjustably controlled by the setting of the potentiometer. As the potential begins to rise across the inductance there is a corresponding rise in potential across the device 14 and load resistance 15 which together form a series circuit in shunt with the inductance. When the potential (in the case of a neon tube) reaches the ionization potential the tube fires which passes current through the load resistance 15 effectively shorting-out the inductance. Voltage across the inductance consequently falls to the extinguishing point of the tube and conduction ceases. The build-up, which in actuality may take a number of cycles of input voltage, and reduction of potential across the inductance occurs cyclically as shown in FIGURE 2*e*, and more specifically it includes an oscillatory build-up to the critical firing value and after firing the inductance voltage drops back to a magnitude consistent with the extinguishing voltage of the device.

Current spikes associated with the device 14 are shown in FIGURE 2*d* and are coincident with conduction of the device. Although these current pulses are indicated as alternating in polarity, as will be more fully explained below, this condition is dependent on the particular setting of the potentiometer, and other settings of the slidewire 11 will provide a train of current pulses through the device 14 of constant polarity.

FIGURES 2*b* and *c* represent two sub-multiple frequency output signals, selected from among many possible ones, that are obtainable by the circuit of FIGURE 1, and these were selected merely to exemplify general operation of the circuit. Details of the utilization to achieve the specific objects of the invention will be set forth below. It is important to emphasize that with the given circuit configuration and input voltage of known frequency, *f*, different sub-multiple frequency signals are achieved by merely changing the setting of the slidewire 11 of the potentiometer. It is also clear that if the frequency of the input voltage is changed there is a corresponding change in voltage drop across the inductance effecting output frequency change.

Confining attention solely to frequency division, it has already been noted that such division occurs on changing the setting of the potentiometer. However, it has been found that the division does not occur for each setting of the potentiometer in the described circuit, but rather only a discrete set of sub-multiple frequencies are available. More particularly, comparing the different parts of the voltage pulses of the input (FIGURE 2*a*) with corresponding parts of the output pulses (FIGURES 2*b* and *c*) it will be noted that rise portions of input pulses are coincident with rise portions of the output pulses, and likewise with the fall portions. As will be made clear, although there are a discrete number of settings of the potentiometer for which the output pulses are obtained in time coincidence with similar parts of the input pulses, other settings of the potentiometer do not provide this type of correlation and the output waveform is considerably different from those illustrated in FIGURES 2*b* and *c*.

The voltage graphs of FIGURES 4*a–d* illustrate examples of frequency division obtained. Thus, with a fundamental square wave signal input FIGURE 4*a* of frequency, *f*, the first-obtained sub-multiple voltage signal is $\frac{1}{3}f$ as in FIGURE 4*b*. Changing the potentiometer setting to decrease the voltage applied to the series resonant circuit successively provides further sub-multiples of $\frac{1}{5}f$ and $\frac{1}{7}f$ as in FIGURES 4*c* and *d*.

Figure 5:
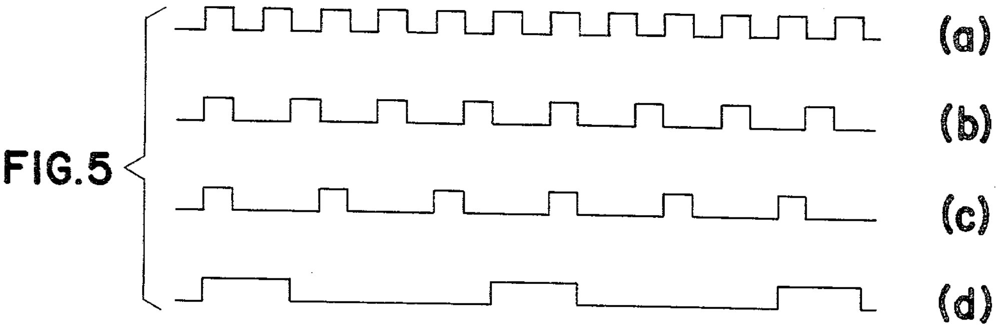

Modification of the circuit configuration of FIGURE 1 to include a diode, not shown, disposed in parallel with the output capacitance 16 to serve as an output for the circuit provides a pulse train of the character shown in FIGURES 5*b–d*. Generally, for a square wave input of frequency *f*, successively greater diminishing potentials applied across the inductance 13 produces asymmetric pulse trains having, for example, respective pulse width ratios of substantially 3:1, 5:1, 7:1, etc. It is to be understood, however, that with different desired potentials across inductance 13, modifications of the waveform of the input signal, and/or different frequencies, that other pulse width ratios are obtainable. Thus, for example, pulse width ratios of substantially 2:1, 3:1, as well as 7:3 and the like are obtainable, as shown, for example, in FIGURES 5*b–d*.

Figure 3:
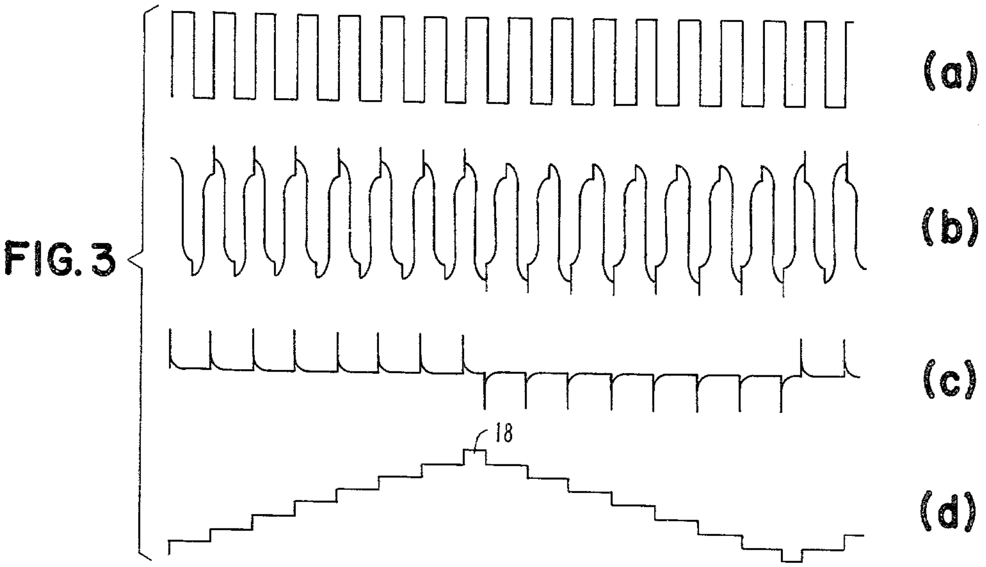
Figure 4:
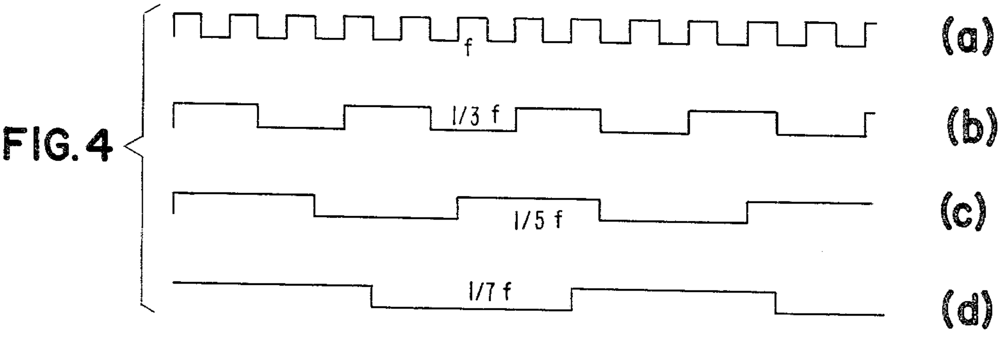

Returning to the first circuit configuration of FIGURE 1, setting the slidewire 11 to positions other than the discrete set of predetermined positions for frequency division effects generation of a stepwise varying or staircase voltage signal. Under these circumstances there is a buildup and decay of voltage across the inductance 13 (FIGURE 3*b*) for each pulse of the input voltage (FIGURE 3*a*). Also, there is a corresponding firing cycle of the device 14, one for each input pulse, as illustrated by the set of positive going spikes in FIGURE 3*c*. Concomitant with the repeated firing of the device in the same direction there is an incremental accumulation of charge on the capacitance 16 which is reflected as a stepwise increasing voltage at the output graphically presented in FIGURE 3*d*. Accumulation of charge in this manner continues until a certain maximum value is reached which is sufficient back-bias for the device 14 to prevent its further firing in the same direction. This maximum point is indicated by the uppermost plateau of voltage 18, after which subsequent firing of the device is in the opposite direction as evidenced by the set of negative going current spikes in FIGURE 3*c*. The effect of these negative spikes is to remove the charge accumulated on the capacitance 16 providing the stepwise descending voltage shown. The descending voltage also reaches a limit and an incremental increase begins again. This staircase voltage cycle will continue in a self-perpetuating manner as long as the potentiometer is maintained at an appropriate setting and an energizing square wave pulse train is applied to the input.

Although there may be any number of specific sets of circuital parameter values which are satisfactory for the circuit of FIGURE 1, the following represent exemplary values for illustrative purposes:

| | |
|---|---|
| Resistance **10** | 5K ohms, helical potentiometer. |
| Capacitance **12** | 0.0007 microfarads. |
| Inductance **13** | 11 henries. |
| Device **14** | Neon tube, NE–96, manufactured by the General Electric Company. |
| Resistance **15** | 1.0 megohms. |
| Capacitance **16** | 0.02 microfarads. |
| Input voltage | 77.2 volts peak-to-peak, square wave at 1820 cycles per second. |

With particular reference to FIGURE 6 there is shown a form of the invention which is especially adapted for performing the function of frequency discrimination. A series resonant circuit comprised of a capacitance 19 and an inductance 20 is arranged in parallel across a pair of input terminals 21 and 22. A gas discharge tube 23 has a first terminal connected to the common point 24 of the capacitance 19 and inductance 20, and its second terminal interconnected via a resistance 25 to the common side of the input terminal 22. A capacitance 26, a forwardly arranged diode 27, and a resistance 28 are serially arranged, extending in that order from a common of the tube 23 and resistance 25 to the output. A second diode 29 has its anode connected to the common 22 and its cathode to the common of the capacitance 26 and the diode 27. A parallel circuit of a capacitance 30 and resistance 31 interconnects the common point of diode 27 and the resistance 28 and the terminal 22. The free end of the resistance 28 is fed simultaneously to an output terminal and the anode of a third diode 32, the other side of which is biased positively from a suitable source (not shown).

In operation, a selectively variable frequency source 33 to be acted upon is applied to the input terminals 21 and 22. As before, the series resonant circuit consisting of the capacitance 19 and inductance 20 controls the firing of the tube 23, and thus the development of a voltage across the resistance 25. The difference here is that the values of the capacitance 19 and inductance 20 are such that they form a resonant circuit at the particular frequency it is desired to select, or discriminate. The voltage formed across resistance 25 on firing of the tube is integrated by the collective effect of the capacitances 26, 30 and the diodes 27, 29, which integrated voltage appears across the resistance 31. The resistance 28 and diode 32 serve in a clipping function to keep the output voltage within predetermined limits. When the input voltage frequency is of the predetermined value a pulse output is provided and which is maintained as long as the input frequency is kept at this value.

It is clear that different circuit parameters are required for discriminating different frequency components from the input signal. Representative of the requirements in this regard are the following sets of parameter values with their associated input frequencies to be discriminated:

| Input Freq., cps. | $R_2$, K. | $C_2$, Mfd. | $C_3$, Mfd. | $L_1$, Hy. | $C_1$, Mfd. |
|---|---|---|---|---|---|
| 750 | 10 | .02 | .02 | 3 | .0125 |
| 940 | 150 | .02 | .02 | 3 | .0091 |
| 1,250 | 70 | .02 | .02 | 3 | .0049 |
| 7,500 | 100 | .002 | .002 | .4 | .0010 |
| 10,000 | 400 | .002 | .002 | .4 | .0006 |

In the description of the different embodiments of the invention given above the primary active element has been particularly defined as a gas discharge device, such as a neon tube. It is not the intention to limit the practice of the invention solely to using two element gas tubes, but rather it is felt to be within the spirit and contemplation of the invention to utilize other voltage threshold switching means for the same function. Exemplary of such means which may be advantageous in certain applications are zener diodes, triple element gas discharge devices, four-layer diodes and silicon controlled rectifiers.

According to the practice of the present invention there are provided apparatus with the capability for transforming a fundamental frequency signal into such form as to enable performing the operations of selective frequency division, staircase voltage generation, production of asymmetric pulse trains and frequency discrimination. Further, this apparatus is characterized by simplicity of construction and the ease with which it can be fabricated, as well as being relatively inexpensive.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for transforming an alternating electric signal to a pulse form, comprising:
a pair of input terminals;
a series resonant circuit arranged across the input terminals in shunting relation;
voltage threshold switching means electrically related to said series resonant circuit for being actuated thereby in a cyclic manner; and
an RC output network fed by the threshold means for providing a pulselike signal output having a characteristic repetition frequency determined by the rate of actuation of the voltage threshold device.

2. Apparatus for transforming an alternating electric signal as in claim 1, wherein the voltage threshold switching means includes a gas discharge device and the series resonant circuit has an impedance characteristic such that impression of the input signal thereacross develops a periodic voltage exceeding the ionization potential of said device.

3. Apparatus for generating an output electric signal of alternating character the frequency and condition of which has a selectively variable relation to the frequency of a driving signal, comprising:
an input means fed by the driving signal;
a resistance potentiometer arranged in parallel to the driving signal and having a selectively variable contact;
an LC series circuit shunted across the variable contact and one end of the potentiometer;
a gas discharge device having first and second terminals, said first terminal being connected to the inductance of the LC circuit;
a load resistance interconnecting the second terminal of said gas discharge device and the common connection of the inductance and potentiometer;
a capacitor electrically arranged in parallel with the load resistance, across which the output is taken;
whereby selective settings of the variable contact of the resistance potentiometer effect corresponding oscillating build-up of voltage across the inductance to fire the gas discharge device at a corresponding rate such that the output voltage exhibits respective submultiple frequencies for a first group of the potentiometer settings and a staircase voltage for the other of the settings.

4. A frequency division circuits, comprising:
a pair of input terminals for receiving a voltage signal to be divided;
a selectively variable impedance shunted across the input terminals;
a resonant tank circuit adapted to receive the selectively variable voltage from said impedance including a series circuit consisting of a capacitance and an inductance;
a voltage threshold switch operatively related with the inductance of the tank circuit and actuated by potential existing across said inductance in excess of a threshold value to provide electric current conduction;
capacitive means electrically related to said threshold device across which a substantially square wave output voltage occurs each switching cycle of the device;
said potentiometer having a set of predetermined resistance values for providing corresponding magnitudes of the input voltage signal relative to the time constant of the output capacitance that successive actuations of the switch provide current conduction in opposite directions effecting an output having a frequency which is a submultiple of that of the input voltage signal.

5. A staircase voltage generator, comprising:
an LC resonant circuit fed by an input alternating voltage signal;
selectively variable means interposed between the LC circuit and the input voltage signal for providing voltage magnitudes of selected magnitudes;
a voltage threshold switching device electrically related to the circuit;
a resistance arranged in series with the switching device such that on actuation of the switching device a current is passed therethrough; and
a capactive output circuit arranged across the resistance;
said selected voltage magnitudes being such relative to the input frequency, impedance characteristics of the resonant circuit and output capacitive circuit that adjacent alternations of the input voltage serve to sequentially accumulate charge in the output circuit to a maximum value followed by an incremental reduction in charge to a second lower maximum value, which is repeated throughout application of the input voltage.

6. Voltage discriminating means for providing a signal indicative of the presence of a predetermined frequency component in an input signal, comprising:
an LC resonant circuit tuned to the frequency of the predetermined frequency component;
threshold switching means driven by the voltage drop occurring across a portion of the LC circuit to provide an electric signal on actuation thereof;
an integrator fed by the switching signal; and
a clipping circuit fed by the intergrating voltage whereby presence of the predetermined frequency component in an input signal produces a continuous voltage pulse as an output signal throughout the duration of the presence of said predetermined frequency component.

7. Apparatus for transforming an alternating electric signal to a pulse form, comprising:
a pair of input terminals;
a series resonant circuit arranged across the input terminals in shunting relation;
voltage threshold switching means electrically related to said series resonant circuit for being actuated thereby in a cyclic manner;
an RC output network fed by the threshold means for providing a pulselike signal output having a characteristic repetition frequency determined by the rate of actuation of the voltage threshold device; and
a selectively variable resistance interconnecting the series resonant circuit and the input terminals such that different settings of the resistance provide correspondingly different magnitudes of electrical signal across said resonant circuit thereby effecting controlled time rate actuation of the threshold switching means to vary pulse repetition rate of the signal output.

8. Apparatus for transforming an alternating electric signal to a pulse form, comprising:
a pair of input terminals;
a series resonant circuit arranged across the input terminals in shunting relation;
voltage threshold switching means electrically related to said series resonant circuit for being actuated thereby in a cyclic manner;
an RC output network fed by the threshold means for providing a pulselike signal output having a characteristic repetition frequency determined by the rate of actuation of the voltage threshold device: and
undirectional impedance means disposed in shunt across the output for providing an asymmetric pulse train.

9. Apparatus for transforming an alternating electric signal to a pulse form, comprising:
a pair of input terminals;
a series resonant circuit arranged across the input terminals in shunting relation;
voltage threshold switching means electrically related to said series resonant circuit for being actuated thereby in a cyclic manner;

an RC output network fed by the threshold means for providing a pulselike signal output having a characteristic repetition frequency determined by the rate of actuation of the voltage threshold device;
an integrator network electrically arranged arranged to receive signals from the RC network; and
a clipping network driven by the integrated signal for providing a continuous output voltage pulse during the application of an input voltage signal of particular frequency characteristics dependent upon the characteristics of the series resonant circuit.

10. Apparatus for transforming an alternating electric signal having a predetermined fundamental frequency to a pulse form, comprising;
a pair of input terminals;
a series resonant circuit arranged across the input terminals in shunting relation;
voltage threshold switching means electrically related to said series resonant circuit for being actuated thereby in a cyclic manner;
an RC output network fed by the threshold means for providing a pulselike signal output having a characteristic repetition frequency determined by the rate of actuation of the voltage threshold device; and
means for varying the amplitude of the alternating electric signal across said resonant circuit to provide first and second modes of operation for said apparatus, said apparatus providing said pulselike signal output with a substantially symmetrical waveform having an odd sub-multiple repetition frequency characteristic related to said fundamental frequency and dependent on the amplitude of said alternating signal in said first operational mode, and said apparatus providing said pulselike signal output with a staircase-shaped waveform having a predetermined number of discrete amplitude levels related to said fundamental frequency and dependent on the amplitude of said alternating electric signal in said second operational mode.

11. Apparatus for transforming an alternating electric signal as in claim 10, in which there is further provided unidirectional impedance means disposed in shunt across the output during said first operational mode for providing an asymmetric pulse train.

References Cited by the Examiner

FOREIGN PATENTS 597,589 8/1959 Italy.

ARTHUR GAUSS, *Primary Examiner.*